United States Patent
Heyne et al.

(10) Patent No.: US 7,330,820 B1
(45) Date of Patent: Feb. 12, 2008

(54) PREMIUM EVALUATION SYSTEMS AND METHODS

(75) Inventors: Laura Esboldt Heyne, Inver Grove Heights, MN (US); Steven Michael Lacke, Hudson, WI (US); Nathan Jaymes Hubbell, St. Paul, MN (US)

(73) Assignee: The St Paul Travelers Companies, Inc., St. Paul, MN (US)

( * ) Notice: Subject to any disclaimer, the term of this patent is extended or adjusted under 35 U.S.C. 154(b) by 0 days.

(21) Appl. No.: 11/180,503

(22) Filed: Jul. 12, 2005

(51) Int. Cl.
*G06Q 10/00* (2006.01)
(52) U.S. Cl. .......................................... 705/4; 705/35
(58) Field of Classification Search ..................... 705/4
See application file for complete search history.

(56) References Cited

U.S. PATENT DOCUMENTS

| | | | |
|---|---|---|---|
| 5,729,700 A * | 3/1998 | Melnikoff | 705/36 R |
| 5,752,237 A | 5/1998 | Cherny | |
| 5,852,808 A | 12/1998 | Cherny | |
| 6,009,402 A | 12/1999 | Whitworth | |
| 6,026,364 A | 2/2000 | Whitworth | |
| 6,456,979 B1 * | 9/2002 | Flagg | 705/4 |
| 6,615,181 B1 * | 9/2003 | Segal | 705/4 |
| 6,684,189 B1 | 1/2004 | Ryan et al. | |
| 2002/0077870 A1 | 6/2002 | Wilkinson | |
| 2002/0161609 A1 | 10/2002 | Zizzamia et al. | |
| 2002/0188480 A1 * | 12/2002 | Liebeskind et al. | 705/4 |
| 2003/0101080 A1 | 5/2003 | Zizzamia et al. | |
| 2003/0200121 A1 | 10/2003 | Santoloci | |
| 2003/0233260 A1 | 12/2003 | Snell et al. | |
| 2004/0128147 A1 | 7/2004 | Vallinayagam et al. | |
| 2004/0181435 A9 | 9/2004 | Snell et al. | |

FOREIGN PATENT DOCUMENTS

| | | |
|---|---|---|
| WO | WO 01/09797 | 2/2001 |
| WO | WO 01/11525 | 2/2001 |
| WO | WO 02/33519 | 4/2002 |
| WO | WO 2005/015360 | 2/2005 |

OTHER PUBLICATIONS

"EPL cover not limited to tailored products", Business Insurance, vol. 36, p. 23, Apr. 22, 2002, ISSN: 0007-6864. From Dialog File 16, Dialog ID No. 09739829 and Supplier No. 85118388.*
"SONAR-D&O Premium Benchmark Tool"; Bond & Financial Products Actuarial, Travelers Insurance Company, Aug. 14, 2007.*
Core, John E. The Directors' and Officers' Insurance Premium: An Outside Assessment of the Quality of Corporate Governance. JLEO. 16:2, 449-77.

(Continued)

*Primary Examiner*—C. Luke Gilligan
*Assistant Examiner*—Vivek Koppikar
(74) *Attorney, Agent, or Firm*—Irah H Donner; Wilmer Cutler Pickering Hale and Dorr LLP

(57) ABSTRACT

The invention relates to systems and methods for determining and evaluation insurance policy premiums based on risks associated with class action lawsuits and non-class action lawsuit related risks.

44 Claims, 6 Drawing Sheets

OTHER PUBLICATIONS

Gutierrez, M. An Economic Analysis of Corporate Directors' Fiduciary Duties. pp. 1-41 (2001).

West, Mark D. Why Shareholders Sue: The Evidence From Japan. Journal of Legal Studies. 30, 351-82 (2001).

Ross, Bernard H. Risk in the Public Sector. Forum for Applied Research and Public Policy. pp. 100-103. (1989).

Alwis, A. et al. D&O Reinsurance Pricing—A Financial Market Approach. Casualty Actuarial Society *Forum.*. pp. 1-21 (2005).

Thomas, Keith. D&O liability in the US: feeling the capacity constraints. Zurich Financial Services. 3 pages. (2004).

Guy Carpenter Develops Industry's First Frequency and Severity Model for Analyzing U.S.

Pricing long-tail excess of loss reinsurance. 31st Annual GIRO Convention. Killarney, Ireland (2004).

* cited by examiner

PREMIUM EVALUATION SYSTEMS AND METHODS

FIELD OF THE INVENTION

The invention relates in general to systems and methods for evaluating insurance premiums, and more particularly to evaluating insurance premiums based on class action lawsuit-based and non-class action lawsuit based risks.

BACKGROUND OF THE INVENTION

In order for insurance companies to be profitable, they need to be able to accurately calculate appropriate premiums for their insurance policies. Insurers offering directors and officers insurance coverage typically face additional challenges in that the marketplace tends to dictate the premium at which the coverage will be bought and sold. Because the market drives the premium, the insurer is forced to determine whether or not the market premium fits into their rate plan, loss experience, expense and profit requirements rather than the more typical scenario of the insurer driving the premium based on these components.

SUMMARY OF THE INVENTION

The invention, in general, relates to systems and methods for objectively evaluating insurance policy premiums. In one aspect, the invention relates to a method for determining a premium for an insurance policy for a company. The method includes calculating a class action lawsuit frequency distribution and a class action lawsuit severity distribution for the company. Such distributions may be based on the market capitalization of the company, the variability of the company's stock price, and on measures of the company's accounting and governance policies and track record. The class action lawsuit distributions, in one embodiment, are based on similar distributions calculated for the market of public companies as a whole.

The method also includes calculating at least one non-class action loss distribution corresponding to non-class action related losses. In one embodiment, the method includes calculating a frequency and a severity distribution for the non-class action related losses.

The method also includes calculating a risk load for inclusion in the premium such that the insurer is likely to achieve a desired return on the policy. The risk load varies on the risk associated with the policy. The method then includes calculating a total premium for the policy based on the distributions and the risk load. In embodiment the total premium also includes an expense load that covers insurer expenses. The premium may also depend on a layer of insurance the insurance policy covers.

In one embodiment, the class action lawsuit distributions relate to the frequency and severity of securities class action lawsuits and the insurance policy includes directors and officers coverage. In another embodiment, the class action lawsuit distributions relate to the frequency and severity of ERISA class action lawsuits, and the insurance policy provides fiduciary liability coverage. In a further embodiment, the class action lawsuit distributions relate to the severity and frequency of employment related class action lawsuits, and the insurance policy provides employment practices liability coverage. In yet another embodiment, the class action lawsuit distributions relate to the severity and frequency of products liability class action lawsuits, and the insurance policy provides products liability coverage. In another embodiment, the insurance policy is a general liability policy.

In second aspect, the invention relates to a method of evaluating an insurance policy. The method includes calculating a benchmark premium for a proposed insurance policy. In one embodiment, the method utilizes the premium determination method described above. In addition, the method includes comparing the benchmark premium to a market premium proposed in the customer requesting the insurance policy. In one embodiment, the method includes outputting the results of the evaluation on an evaluation chart which graphically indicates the desirability of the policy to an insurer.

In another aspect, the invention relates to computer readable media encoding instructions for causing a computing device to carryout the methods described above.

BRIEF DESCRIPTION OF THE DRAWINGS

The system and methods disclosed herein may be better understood from the following illustrative description with reference to the following drawings in which.

DETAILED DESCRIPTION

To provide an overall understanding of the invention, certain illustrative embodiments will now be described, including a system and a method for determining and evaluating insurance policy premiums. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
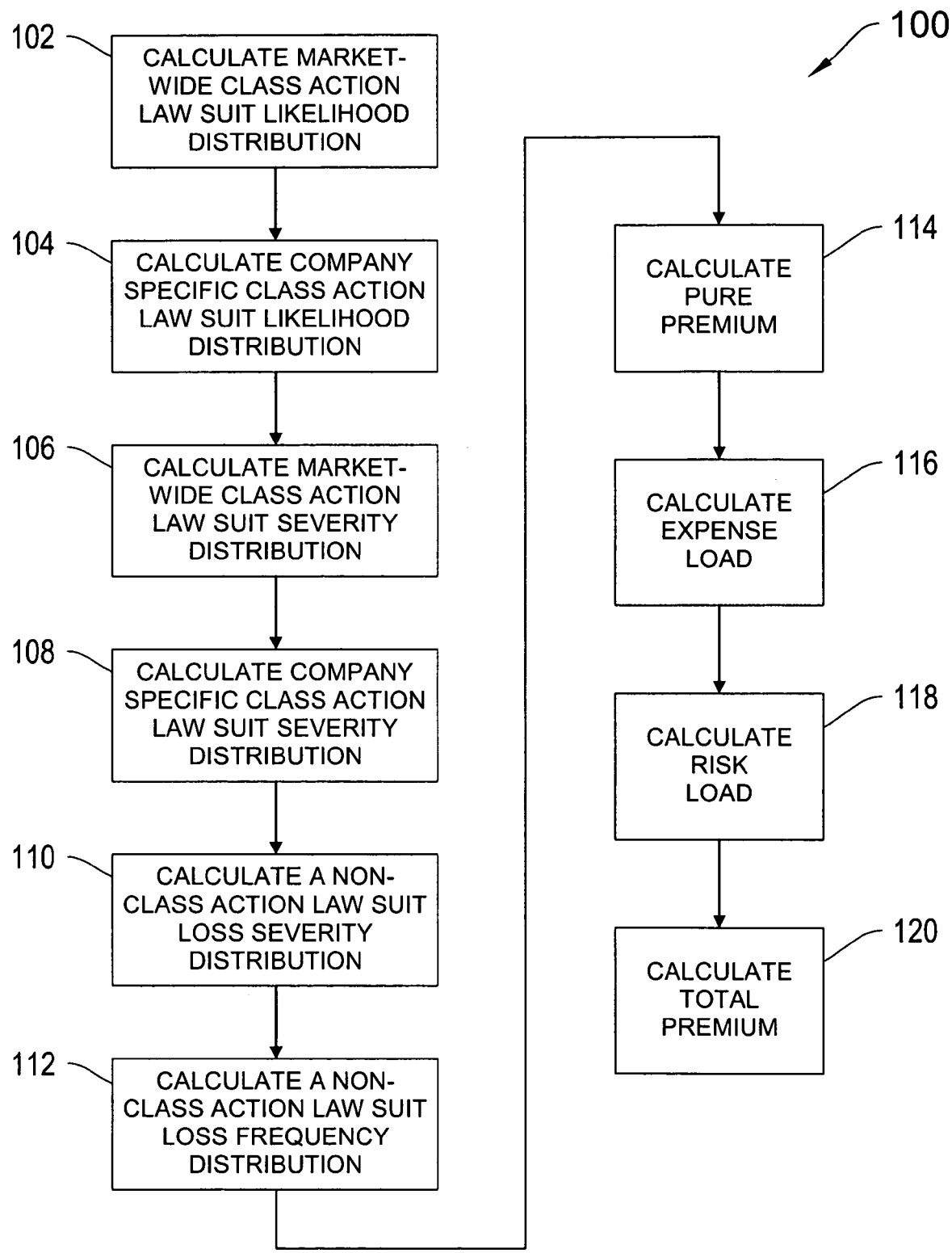
FIG. 1 is flowchart of a method of determining a premium for an insurance policy according to an illustrative embodiment of the invention.

FIG. 1 is a flowchart of a method 100 of determining a premium for an insurance policy (the "premium determination method 100") for a selected company according to an illustrative embodiment of the invention. Insurance premiums, in general, are determined by insurance companies such that statistically the insurance companies are likely to receive more income in premiums than they pay out in claims over an extended period of time and over a portfolio of insurance policies. To do so, the insurance companies need to be able to accurately estimate the potential risks such insurance policies entail.

For business insurance, risks can be divided into two types, those related to class action lawsuits, and those related to non-class action lawsuit losses. Depending on the type of coverage included in the insurance policy, different types of class action lawsuits pose different risks. For example, fiduciary liability insurance policies cover costs associated with ERISA class action lawsuits. Employment practices liability employment policies cover the costs associated with employment class action lawsuits, such as claims of discrimination. Products liability policies cover the costs arising from products liability class action lawsuits. For directors and officers insurance policies, the primary class action lawsuit concern is securities class action lawsuits ("SCALs").

Non-class action lawsuit losses include losses resulting from lawsuits which are not class action lawsuits and losses that are unrelated to lawsuits entirely. Depending on the insurance policy, such losses might include, for example, and without limitation, professional errors, bodily injury, or personal defamation.

The premium determination method 100 includes statistically analyzing the likely frequency of losses from both types of losses, and the likely severity of such losses if they occur. For illustrative purposes, the remainder of the application describes directors and officers insurance policy premium pricing and evaluation based in part on the risks associated with SCALS. However, the methodology described herein can equally be applied to pricing premiums for other insurance coverages by analyzing the relevant class action lawsuit risk corresponding to the coverage. Referring back to FIG. 1, at step 102, an insurer calculates a market-wide SCAL frequency distribution. Preferably, the distribution takes the form of a negative binomial distribution. The negative binomial distribution indicates the probability that an rth occurrence of an event will occur after z years. More concretely, the SCAL frequency distribution identifies the likelihood that it will take z number of years before a company faces its rth SCAL. The negative binomial distribution is defined by the following equation:

$$P(z) = [1 - \beta(z-1)]^{-r},$$

wherein β corresponds to the probability that a company will face a class action lawsuit in a given year divided by the complement of the probability. Such a distribution can be generated based on publicly available data regarding the frequency of SCALs. For example, the market-wide SCAL frequency distribution can be derived from data maintained by Cornerstone Research, a consulting company with offices in New York, N.Y.; Boston, Mass.; San Francisco, Los Angeles, and Menlo Park, Calif.; and Washington, D.C., and the Securities Class Action Filings Clearinghouse, associated with Stanford Law School. Fitting the data in these data sets to a negative binomial distribution yields an industry-wide SCAL frequency distribution having an r parameter equal to 0.16 and a β equal to 0.19. The mean of the distribution equals 3%.

After the insurer calculates a market-wide SCAL frequency distribution, the insurer calculates a company-specific SCAL frequency distribution (step 104). The insurer conducts a regression analysis to determine which characteristics of companies effect the frequency with which companies face SCALs. Based on the example data sets, it was determined that SCAL frequency varies in relation to the market capitalization of the company, measures of the company's accounting and governance policies, and the variability of the company's stock price (i.e, the stock's beta). In one implementation, the company's accounting and governance polices and track record are measured according to the AGR score assigned to the company, for example, by Audit Integrity based in New York, N.Y. and Los Angeles, Calif., which provides statistical analyses of companies' accounting and corporate governance policies and financial track records.

The insurer calculates the company-specific SCAL frequency distribution (step 104) based on the market-wide SCAL frequency distribution and likelihood value, L, which indicates the likelihood that a particular company will face a SCAL. L is determined according to the following equation:

$$L(X; B) = \frac{1}{1 + e^{-\alpha - \Sigma x_i \beta_i}} \in [0, 1],$$

wherein, X corresponds to the set of variables $[x_1 \ldots x_6]$ identified in the regression analysis as being related to SCAL frequency, and B includes a corresponding set of coefficients $[\beta_1 \ldots \beta_6]$ for the variables. An illustrative set of variables and corresponding coefficients is listed in Table 1 below. The α parameter in the above equation represents an intercept value, for example, −13.12, for the illustrative data set. The market-wide SCAL frequency distribution is adjusted to form the company-specific SCAL frequency distribution by setting the mean of the distribution to L while maintaining the coefficient of variation of the market-wide SCAL frequency distribution.

TABLE 1

| i | x | β |
|---|---|---|
| 1 | LN(Market Capitalization, in millions of $US) | 1.440 |
| 2 | LN(AGR) | 1.812 |
| 3 | Stock Beta | 1.004 |
| 4 | LN(Market Capitalization, in millions of $US) * Stock beta | 0.088 |
| 5 | LN(AGR) * LN(Market Capitalization, in millions of $US) | −0.0296 |
| 6 | Stock Beta * LN(AGR) | −0.227 |

The insurer also calculates a market-wide SCAL severity distribution (step 106) corresponding to the likely costs of settling or losing a SCAL. Preferably, the SCAL severity distribution takes the form of a lognormal probability distribution defined by the following equation:

$$f(x) = \frac{e^{-\ln(x-\mu)^2/2\sigma^2}}{x\sigma\sqrt{2\pi}}, x \geq 0, \sigma > 0$$

where σ corresponds to a shape parameter, and μ corresponds to the relative position of the distribution along the x axis. The mean of the lognormal distribution is defined as:

$$E(x) = e^{\mu + \frac{\sigma^2}{2}},$$

and the variance of the distribution is defined as:

$$Var(x) = (e^{\sigma^2} - 1)e^{2\mu + \sigma^2}.$$

Such a distribution can be generated for SCAL severity, for example, based on data made available by the Institutional Shareholder Services Database (the "ISS Database"), headquartered in Rockville, Md. The ISS Database includes SCAL data for all public companies filed since 1996. The data in the ISS Database can be fit to an illustrative market-wide SCAL severity distribution with lognormal parameters σ and μ of 1.748 and 15.283, respectively. The coefficient of variation of illustrative distribution is 4.50. More concretely, based on the distribution, the mean severity of the SCAL is equal to approximately $20 million.

Using the market-wide SCAL severity distribution, the insurer determines a SCAL severity distribution for the selected company (step 108). Based on a regression analysis, it has been determined that the likely severity of a SCAL severity for a company varies in relation to the market capitalization of the company. In particular, the 12-month lagged market capitalization of the company has proven to be an effective indicator of likely SCAL severity. Based on the regression analysis, preferably, a selected company's SCAL severity likelihood is fit to a lognormal distribution having a mean equal to 0.0066 times the 12-month lagged market capitalization of the company and having a coefficient of variation equal to the coefficient of variation determined in step 106 for the market as a whole.

In determining the market-wide SCAL severity and frequency distributions, the distributions preferably take into account statistics for all public companies. In other implementations, however, statistics for smaller sets of company's may be substituted. For example, some industry groups tend to face more frequent SCALs and incur larger losses when the SCALS occur. In determining a premium for members of such an industry group, the insurer optionally utilizes an industry group-wide distribution instead of a market-wide distribution. Alternatively, the insurer still includes data for all public companies in the distributions, but biases the distributions based on the industry group to which a prospective customer belongs.

One additional feature of the premium determination method 100 includes adjusting the market-wide SCAL severity distribution or the market-wide SCAL frequency distribution based on SCAL dismissal statistics. Evidence indicates that approximately 40% of all SCALs are dismissed without a loss to the company.

The premium determination method 100 includes calculating market-wide non-SCAL loss severity and non-SCAL frequency distributions (steps 110 and 112, respectively). Preferably, the insurer assumes that non-SCAL losses are company independent, and thus forgoes calculating company-specific non-SCAL distributions. However, in other implementations, such distributions can be calculated based on company-specific data. For example, a company-specific non-SCAL severity distribution can be generated in part on the market capitalization of the company, and a company-specific non-SCAL frequency distribution can be based in part on the industry sector to which the company belongs.

Preferably the market-wide non-SCAL loss distributions are derived from historical data maintained by the insurer determining the premium or from data obtained from external data sources. As with the SCAL related distributions, the insurer preferably bases the non-SCAL distributions on data corresponding to a set of companies that attempts to replicate the market as a whole. In some cases, however, more narrowly defined distributions may be desirable and used instead.

In the illustrative implementation, the premium determination method 100 includes calculating a negative binomial distribution for the non-SCAL frequency distribution (step 110). Preferably, the insurer takes into account at least about ten years of trended insurance company data in calculating the distribution. Based on one insurer's data, the resulting industry-wide non-SCAL frequency distribution has an r parameter equal to 0.16 and a β equal to 0.19.

At step 112, the insurer generates a non-SCAL loss severity distribution. Preferably the distribution takes the form of a lognormal distribution. Using the same data employed in calculating the non-SCAL frequency distribution, the resulting severity distribution has a mu parameter of 10.47 with a sigma value of 1.81. The coefficient of variation for the distribution is equal to 5.00.

Next, the insurer preferably calculates three premium components (Steps 114-118), based in part on the calculated distributions. The insurer calculates a pure premium at step 114, an expense load at step 116, and a risk load at step 118. Statistically, if an insurer charged its customers the pure premium for it's insurance policies, the insurer would neither profit or lose money from claims arising from those policies. However, a pure premium does not take into account any expenses, such as overhead, commissions, marketing, personnel, etc. incurred by an insurer in offering, selling, or maintaining an insurance policy. The expense load covers these costs and can vary greatly among insurers. The risk load relates the profit level desired by the insurer. More particularly, the risk load corresponds to the required surplus per policy that is needed to generate a desired return. In general, companies with higher likelihoods of losses require more surplus to ensure the desired profit levels of the insured.

The premium determination method determines a pure premium for an insurance policy at step 114. To generate the pure premium, the insurer simulates a large number of years using the calculated frequency and severity distributions. The simulated years include several loss scenarios. Each loss scenario corresponds to a total number of losses (SCAL and non-SCAL) a company faces in a given year. Analysis of sample data reveals that the likelihood of a company incurring more than 4 losses in a given year is negligible. Thus, preferably, the insurer analyzes 5 loss scenarios: 0 losses in a year, 1 loss in a year, 2 losses in a year, 3 losses in a year, and 4 losses in a year. Preferably, the insurer simulates about 10,000 years for each scenario to ensure convergence of the mean. However, the insurer may simulate fewer or more years, as long as the data sufficiently converges to the mean. For example, the insurer may simulate as few as 5,000 years and still likely achieve a suitable level of convergence.

For each simulated year, based on the relative frequency distributions of SCAL losses and non-SCAL losses, the insurer utilizes a Monte Carlo simulation to determine whether each loss (if any) in the simulated year is a SCAL-based loss or a non-SCAL-based loss. Then, a severity is assigned to each loss based on the corresponding severity distribution using a Latin Hypercube simulation.

Each loss is then processed to determine the cost to the insurer resulting from the loss. For a given loss, an insurer is responsible for covering any portion of the loss that exceeds any applicable retentions or underlying insurance policies up to the limit of the corresponding policy. For example, consider an insurance policy having a $2 million limit, with a $2 million underlying policy, and a $500,000 retention. For such a policy, the insurer would be responsible for losses greater $2.5 million, up to a total of $2 million. However, in no case would the insurer be responsible for more than $2 million in losses. Thus for the purposes of determining a pure premium for an insurance policy, the insurer reduces each simulated loss by any retentions or underlying insurance policy limits and caps the losses for each simulated year at the policy limit. A loss, adjusted for retentions, underlying insurance policies, and the liability limit is referred to herein as a covered loss.

The insurer then totals the covered losses for each loss scenario. The insurer divides each loss scenario total by the number of years included in the simulation and weights each total by the likelihood of the loss scenario occurring based on a combined SCAL and non-SCAL frequency distribution. The sum of these weighted loss scenario totals serves as the pure premium.

At step 116, the premium determination method 100 includes determining the appropriate expense load to include in the premium. The expense load includes commission and brokerage costs, taxes, licenses, and other related fees, general expenses, other acquisition expenses, and adjusting expense, referred to in general as unallocated loss adjustment expenses ("ULAE"). Values for components of the expense load for a particular insurer can be found in one or more documents, such as an Insurance Expense Exhibit, filed by the insurer with state regulatory agencies.

At step 118, the premium determination method 100 includes determining an applicable risk load for the policy. The risk load is a surplus amount over the pure premium which is required by the insurer to achieve an expected return on an insurance policy. As an insurer issues policies which represent more volatile risks, the insurer's risk load must be larger to maintain a desired rate of return across the entire portfolio of risks.

Insurers maintain premium to surplus ratios for the various coverages they offer. The premium to surplus ratio gives a guideline for the amount of premium that can be written given an available surplus. For example, depending on the coverage, an insurer may write between ½ and 5 times the its aggregate surplus level. In general, an insurer will maintain a lower premium to surplus ratio on riskier policies. Accordingly, for directors and officers insurance, insurers typically maintain a surplus to premium ratio of between about 1:2 and 2:1.

The insurer preferably bases the risk load for a policy based on the appropriate surplus to premium ratio and the coefficient of variation of an aggregate loss distribution that combines both loss frequency and loss severity data for the corresponding coverage. For directors and officers coverage, preferably, the insurer generates multiple combined frequency-severity distributions corresponding to various market capitalization classes. Table 2, below, lists one illustrative set of suitable market capitalization classifications for the combined severity-frequency distributions. In one implementation, the combined severity-frequency distributions assume a static frequency distribution for each distribution. In another implementation, the frequency for each distribution is calculated as in step 102, limiting the companies included in each distribution to those having market capitalizations in the range corresponding to the particular distribution.

The insurer also preferably maintains statistics for its overall portfolio, from which the insurer can determine a coefficient of variation for an average risk in the portfolio. The insurer then determines the risk load based on the surplus to premium ratio, the pure premium for the particular policy, and the ratio between the coefficient of variation of the corresponding combined frequency-severity distribution and the coefficient of variation of the average risk in the portfolio.

The insurer combines the pure premium, the expense load, and the risk load to form the policy premium (step 120).

Figure 2:
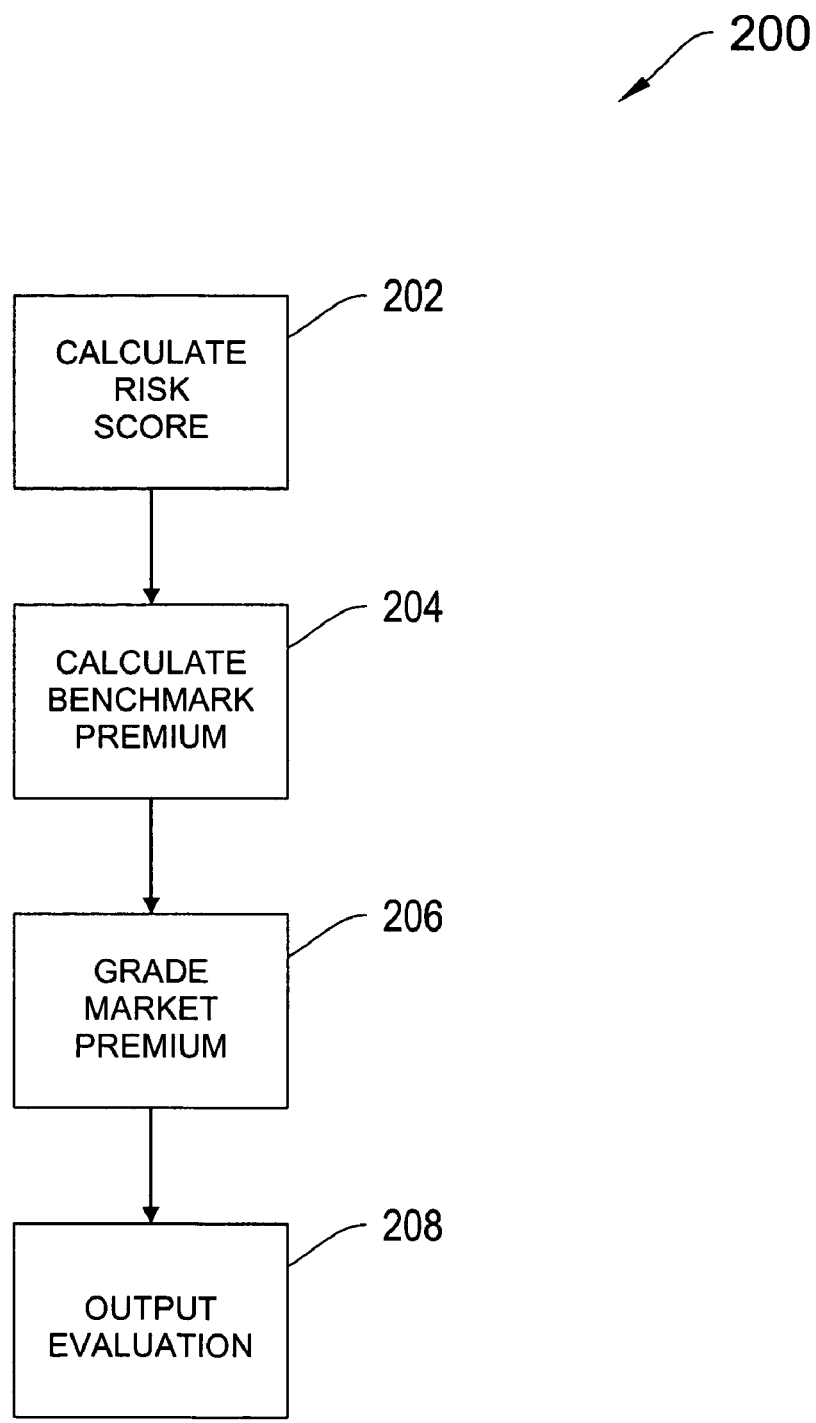
FIG. 2 is flowchart of a method of evaluating a proposed insurance policy based on the premium determination method depicted in FIG. 1, according to an illustrative embodiment of the invention.

FIG. 2 is a flowchart of a method 200 for evaluating a request for an insurance policy (the "policy request evaluation method 200") incorporating the premium determination method 100, according to an illustrative embodiment of the invention. For most insurance coverages, a company seeking an insurance policy contacts an insurer to obtain a quote. For a directors and officers insurance policy, the marketplace determines the premium that the company is willing to pay for the policy (referred to as the "market premium"). An insurer has an option of agreeing to accept this premium given the terms of coverage.

The policy request evaluation method 200 evaluates the proposed policy in view of characteristics of the company, the requested policy parameters, the market premium, and a benchmark premium determined according to the premium determination method 100. In general, the policy request evaluation method 200 can be employed to evaluate the appropriateness of a premium for an insurance policy, whether the policy is generated by a company requesting the policy, or by an insurer evaluating a premium it determined itself. An insurer can use the results of the policy request evaluation method 200 to objectively determine whether accepting a policy premium is a sound business decision.

More particularly, the policy request evaluation method preferably includes calculating a risk score (step 202) for a company, calculating a benchmark premium for the proposed policy using the premium determination method 100 (step 204), grading the offered premium based on the benchmark premium (step 206), and outputting an evaluation of the requested policy (step 208).

The risk score is preferably calculated (step 202) based on the same factors used to adjust the SCAL loss frequency and severity distributions described above, namely the market capitalization of the company, the company's stock beta, and the company's AGR score. In the illustrative implementation, several levels of likely loss severity and loss frequency are defined and assigned a score. The level definitions and corresponding scores are listed below in Tables 2 and 3. Preferably, an insurer sets the a company's risk score by totaling the scores assigned to a loss severity level and a loss frequency level to which the company belongs, dividing the total by the highest possible risk score, and multiplying the result by 100. A higher score represents a riskier company to insure.

TABLE 2

Severity Levels

| Market Capitalization | Score |
|---|---|
| 0-50M | 1 |
| 50M-300M | 3 |
| 300M-2B | 5 |
| 2B-10B | 7 |
| 10B-200B | 9 |
| >200B | 11 |

TABLE 3

Frequency Levels

| Stock Beta | AGR | Market Capitalization | Score |
|---|---|---|---|
| <1.1 | >50 | <10B | 1 |
| <1.1 | <50 | <10B | 2 |
| >1.1 | >50 | <10B | 3 |
| >1.1 | <50 | <10B | 4 |
| <1.1 | >50 | >10B | 5 |
| <1.1 | <50 | >10B | 6 |
| >1.1 | >50 | >10B | 7 |
| >1.1 | <50 | >10B | 8 |

The policy request evaluation method 200 also includes calculating a benchmark premium for the requested policy (step 204). The benchmark premium is the premium the insurer would have offered to the company had the insurer calculated a premium for the company using the premium determination method 100.

The insurer then compares the market premium to the benchmark premium to obtain a premium grade (step 206). In general, the higher the market premium is in comparison to the benchmark premium, the more attractive the requested policy is to the insurer. An illustrative grading scheme is provided in Table 4 below.

TABLE 4

Premium Grading Scheme

| | |
|---|---|
| Market > 110% Benchmark | A |
| 110% Benchmark > Market > 90% Benchmark | B |
| 90% Benchmark > Market > 80% Benchmark | C |
| 80% Benchmark > Market > 70% Benchmark | D |
| Market < 70% Benchmark | F |

At step 208, the policy request evaluation method 200 outputs an evaluation of the requested insurance policy. In the illustrative implementation, the evaluation is output in the form of a chart.

Figure 3:
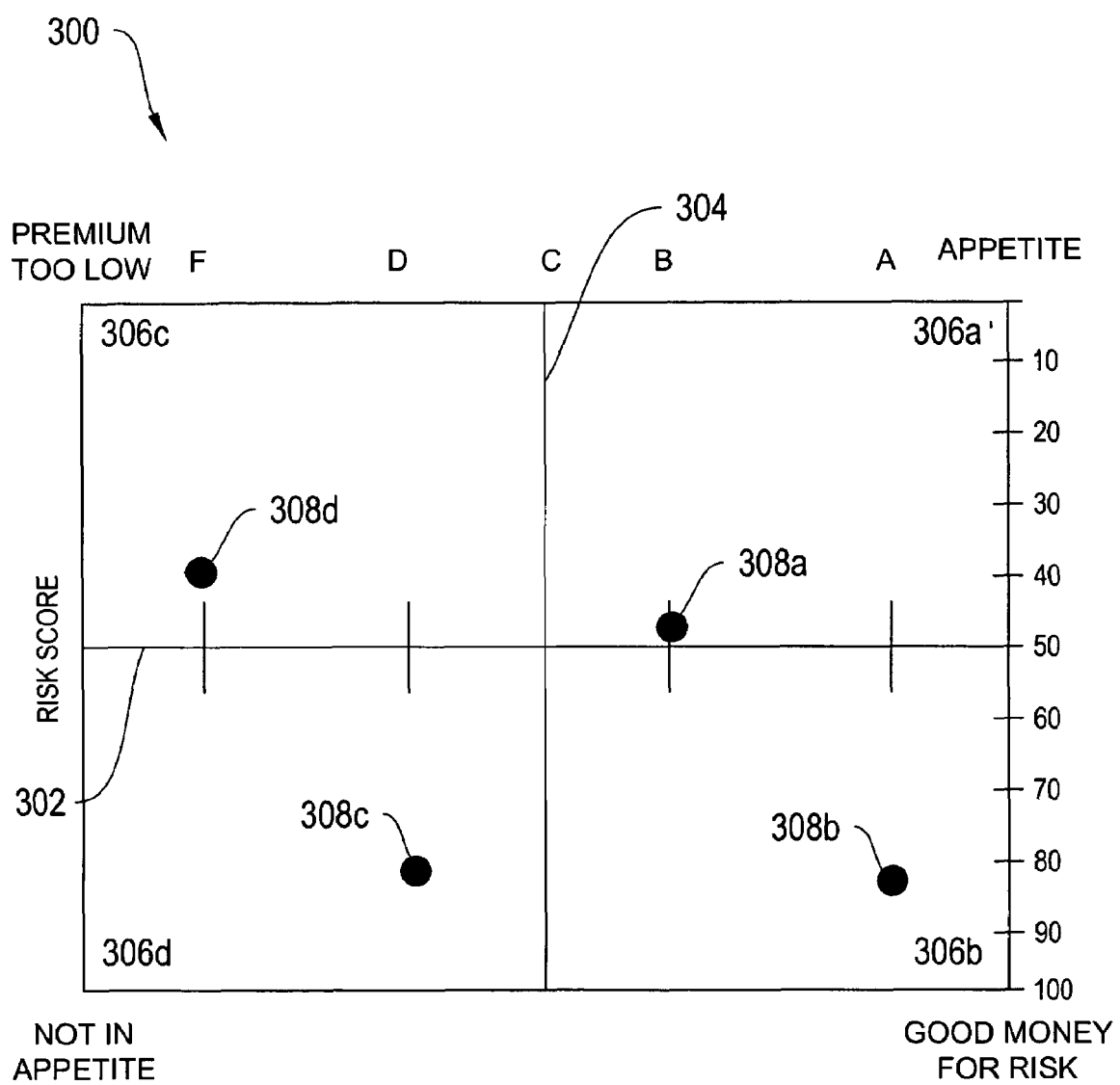
FIG. 3 is a graphical output of the evaluation of four proposed insurance policies resulting from the method depicted in FIG. 2, according to an illustrative embodiment of the invention.

FIG. 3 is an illustrative evaluation output chart 300 as generated in step 208 of the policy request evaluation method 200. The horizontal axis 302 of the evaluation output chart 300 corresponds to the premium grade determined at step 206 of the policy request evaluation method 200. The vertical axis 304 of the evaluation output chart 300 corresponds to the risk score calculated for the company at step 202 of the policy request evaluation method 200.

The chart is divided into four quadrants 306a-306d. Each quadrant 306 corresponds to a characterization of policy requests that fall within the quadrant 306. Quadrant 306a corresponds to policy requests which are from companies with relatively low risk scores (i.e., less than 50), and which include a market premium which is near or above the benchmark premium (i.e., market premiums receiving grades of A or B). Quadrant 306b corresponds to policy requests which are from companies having relatively high risk scores (i.e., greater than 50), and which include a market premium which is near or above the benchmark premium (i.e., market premiums receiving grades of A or B). Quadrant 306c corresponds to policy requests which are from companies have relatively low risk scores (i.e., less than 50), but which include market premiums that are substantially below the benchmark premium (i.e., market premiums receiving grades of D or F). Lastly, quadrant 306d corresponds to policy requests which are from companies having relatively high risk scores (i.e., greater than 50), and which include a market premium which is substantially below the benchmark premium (i.e., market premiums receiving grades of D or F). Policies falling into quadrant 306d are the least desirable.

In general, accepting policy requests falling in quadrants 306a and 306b are relatively sound business decisions, as the market premium is high enough that the insurer can expect to achieve its desired profit level. Policy requests falling in quadrant 306a are the most desirable, as the associated risks are relatively low. Policies falling into quadrants 306c and 306d generally are unwise to accept, as the market premium is too low for an insurer to expect to achieve the desired returns from the policy. Policies having a premium grade of C, i.e., which fall between quadrants 306a and 306c and quadrants 306b and 306d, are considered to be borderline policies. The wisdom in accepting such policies depends on the overall risk profile of the insurer's policy portfolio.

The evaluation output chart 300 includes four data points 308a, 308b, 308c, and 308d corresponding to illustrative evaluations of four fictional companies, Company A, Company B, Company C, and Company D, respectively. The evaluations were based on the application of the policy request evaluation method 200, described in relation to FIG. 2. The examples all use the market-wide SCAL and non-SCAL loss distributions calculated above in relation to steps 102, 106, 110, and 112 described in relation to FIG. 1. The evaluation of Company A is described in further detail to illustrate the application of the premium determination method 100 on simulated data.

EXAMPLE 1

Company A

Company A has a market capitalization of $1 billion, a stock beta of 1.25, and an AGR score of 60. Company A is requesting an insurance policy with a $10 million limit, a $1 million retention, and with $10 million of underlying insurance. The market price of the requested policy is $125,000.

Based on the above parameters and the classification levels provided in Tables 2 and 3, Company A is assigned a risk score of 47 (step 202). Next, the premium determination method is applied to determine a benchmark premium for the requested policy (step 204). First the insurer alters the industry-wide SCAL frequency distribution to fit Company A's characteristics (step 104). The insurer computes the likelihood function, L, as described above, to determine the probability of Company A incurring a loss. Based on the Company A's stock beta, market capitalization, and AGR score, L is equal to approximately 3.7%. To take into account the probability that SCAL cases are dismissed 40% percent of the time, this probability is reduced by 40%. Accordingly, Company A is estimated to face an approximate 2.2% chance of facing a new SCAL in a given year. To have the company-specific SCAL frequency distribution retain the same coefficient of variation as the market-wide frequency distribution (i.e., 7.346), the company-specific SCAL frequency distribution is set to have a standard deviation of 16.1%. The resulting r and β parameters of the distribution are equal to 0.12 and 0.19, respectively.

Next, a company-specific SCAL severity distribution is calculated for Company A (step 108). The mean of the distribution is set to 5.8 million, (i.e., to 0.0066*Company A's market capitalization of $1 billion*a normalization factor). The coefficient of variation of the company-specific SCAL severity is matched to the coefficient of variation of the corresponding market-wide distribution (i.e., 4.5). The resulting μ and σ values for the company-specific distribution are equal to 14.052 and 1.748, respectively.

Based on the calculated company-specific SCAL distributions and the market-wide non-SCAL distributions, a pure premium is estimated (step 114) for the policy requested by Company A. Tables 5-7 include illustrative loss simulation results for Company A for each loss scenario.

TABLE 5

Total Simulated Loss

| Claims | Samples | Total Loss (thousands) | Retention (thousands) | Underlying (thousands) | Covered Loss (thousands) | Excess (thousands) |
|---|---|---|---|---|---|---|
| 0 | 0 | 0 | 0 | 0 | 0 | 0 |
| 1 | 10,000 | 16,386,295 | 3,760,403 | 9,403,912 | 3,019,746 | 2,02,234 |
| 2 | 10,000 | 36,050,756 | 7,601,754 | 19,600,541 | 7,573,957 | 1,274,505 |
| 3 | 10,000 | 50,310,951 | 11,385,480 | 26,489,810 | 9,917,521 | 2,518,141 |
| 4 | 10,000 | 68,537,449 | 15,206,621 | 34,807,318 | 14,179,921 | 4,343,589 |
| Total | 40,000 | 171,285,451 | 37,654,257 | 90,301,581 | 34,691,145 | 8,338,468 |

TABLE 6

Average Annual Loss

| Claims | Samples | Total Loss (thousands) | Retention (thousands) | Underlying (thousands) | Covered Loss (thousands) | Excess (thousands) |
|---|---|---|---|---|---|---|
| 0 | 0 | 0 | 0 | 0 | 0 | 0 |
| 1 | 10,000 | 1,639 | 376 | 940 | 302 | 20 |
| 2 | 10,000 | 3,605 | 760 | 1,960 | 757 | 127 |
| 3 | 10,000 | 5,031 | 1,139 | 2,649 | 992 | 252 |
| 4 | 10,000 | 6,854 | 1,521 | 2,481 | 1,418 | 434 |
| Total | 40,000 | 4,282 | 949 | 2,258 | 867 | 208 |

TABLE 7

Expected Loss

| Claims | Likelihood | Total Loss | Retention | Underlying | Covered Loss | Excess |
|---|---|---|---|---|---|---|
| 0 | 95.34% | 0 | 0 | 0 | 0 | 0 |
| 1 | 4.19% | 68,615 | 15,746 | 39,377 | 12,645 | 847 |
| 2 | 0.42% | 15,109 | 3,186 | 8,215 | 3,174 | 534 |
| 3 | 0.05% | 2,505 | 567 | 1,319 | 494 | 125 |
| 4 | 0.01% | 437 | 97 | 222 | 91 | 28 |
| Total | 100% | 86,667 | 19,596 | 49,133 | 16,403 | 1,534 |

Table 5 lists the total losses for company A over 10,000 simulated years of each loss scenario. Table 5 breaks down the losses among losses covered by a retention, underlying policies, losses covered by the insurer, and losses above the insurer's limit. For example, for the 10,000 simulated years in which Company A experiences 1 loss per year, Table 5 indicates that Company A incurred approximately $16 billion in losses. Company A absorbed approximately $3.7 billion of those losses directly in the form of its retention. Another insurance company or companies absorbed about another $9.4 billion of losses through underlying insurance policies. In the end, the insurer was only responsible for about $3 billion of the simulated losses. The remaining losses, totaling approximately $2 billion, exceeded Company A's liability limit, and are covered either by another excess policy or by Company A. In the 4 loss per year loss scenario simulations, according to Table 5, Company A suffered approximately $69 billion in losses over 10,000 simulated years. The insurer was responsible for approximately $14 billion of the total losses.

Table 6 breaks the losses down to average losses per year for each scenario. For example, if Company A faces only 1 loss in a year, based on the simulations, the insurer can expect to have to pay out approximately $300,000 in covered losses. If Company A faces 2 losses in a year, the insurer can expect to have to pay about $750,000.

Table 7 lists the average annual losses per loss scenario weighted by the likelihood of a year falling into each scenario. For example, according to Table 7, the likelihood that Company A will not incur any losses in a year is greater than 95%. There is only 4.19% likelihood that Company A will face a single loss, 0.42% likelihood that Company A company will face exactly 2 losses, a 0.05% chance that Company A will incur exactly 3 losses, and a 0.01% likelihood the company will incur exactly 4 losses. The percentages are calculated based on a negative binomial distribution combining the company-specific SCAL frequency distribution and the market-wide non-SCAL frequency distribution. The total of the weighted averages equals the pure premium, which for Company A equals $16,403.

Based on the illustrative insurance company's risk loads and expense loads (determined at steps 116 and 118), the total benchmark premium for the requested policy is determined (step 120) to be equal to $129,088 per year. The market premium is equal to approximately 97% of the benchmark premium. Thus, the policy receives a B premium grade (step 206).

The results of the evaluation are output (step 208) as a data point 308a on the evaluation output chart 300. Data point 308a is located in quadrant 306a, indicating that the requested policy should most likely be accepted.

EXAMPLE 2

Company B

Company B has a market capitalization of $12 billion, a stock beta of 1.80, and an AGR score of 40. Company B is requesting an insurance policy with a $10 million limit, a $1 million retention, and with $50 million of underlying insurance. The market price of the requested policy is $600,000

Based on these parameters, Company B is assigned a risk score of 84 (step 202). According to the premium determination method 100, the benchmark premium for the policy requested by Company B is equal to $525,405 per year (step 204). The market premium is equal to approximately 115% of the benchmark premium. Thus, the policy receives an A premium grade (step 206).

The results of the evaluation are output (step 208) as data point 308b on the evaluation output chart 300. Data point 308b is located in quadrant 306b, indicating that the market premium is sufficiently high to warrant insuring the company, even though it has a relatively risk of incurring covered losses.

EXAMPLE 3

Company C

Company C has a market capitalization of $15 billion, a stock beta of 2.00, and an AGR score of 35. Company C is requesting an insurance policy with a $10 million limit, a $1 million retention, and with $10 million of underlying insurance. The market price of the requested policy is $1 million.

Based on these parameters, Company C is assigned a risk score of 84 (step 202). According to the premium determination method 100, the benchmark premium for the policy requested by Company C is equal to $1,273,685 per year (step 204). The market premium is equal to approximately 79% of the benchmark premium. Thus, the policy receives a D premium grade (step 206).

The results of the evaluation are output (step 208) as data point 308c on the evaluation output chart 300. Data point 308c is located in quadrant 306d, indicating that the market premium is too low to warrant insuring Company C, particularly because there is a relatively high risk that Company C will incur substantial covered losses.

EXAMPLE 4

Company D

Company D has a market capitalization of $1 billion, a stock beta of 1.00, and an AGR score of 75. Company D is requesting an insurance policy with a $10 million limit, a $1 million retention, and with $10 million of underlying insurance. The market price of the requested policy is $80,000

Based on these parameters, Company D is assigned a risk score of 37 (step 202). According to the premium determination method 100, the benchmark premium for the policy requested by Company D is equal to $124,464 per year (step 204). The market premium is equal to approximately 64% of the benchmark premium. Thus, the policy receives an F premium grade (step 206).

The results of the evaluation are output (step 208) as data point 308d on the evaluation output chart 300. Data point 308d is located in quadrant 306c, indicating that the market premium is too low to warrant insuring the company, even though it has a relatively low risk of incurring covered losses.

System Implementations

Figure 4:
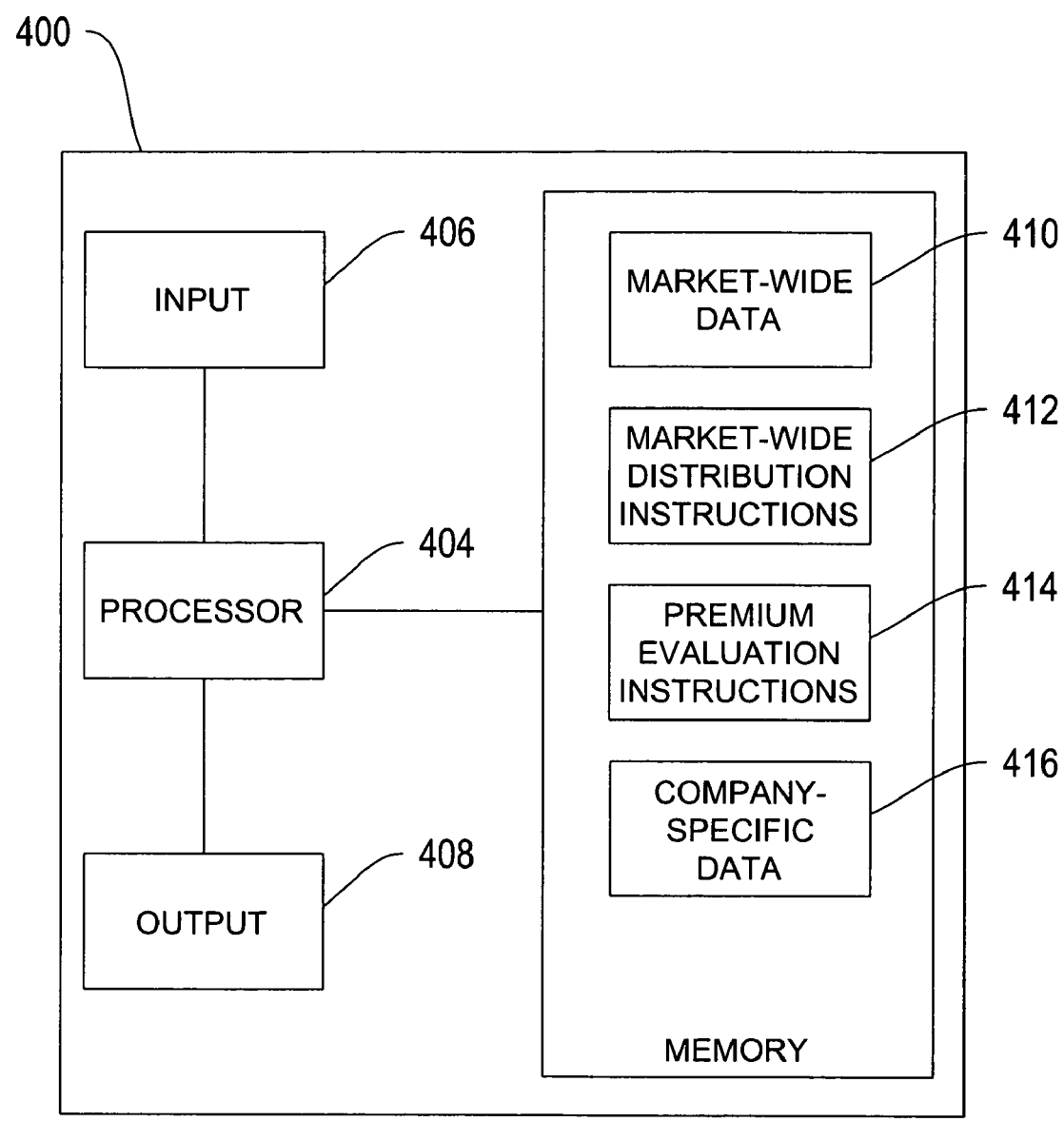
FIG. 4 is a block diagram of a standalone premium evaluation system, according to an illustrative embodiment of the invention.

FIG. 4 is a block diagram of a standalone implementation of a system 400 for implementing the premium determination method 100 and the policy request evaluation method 200 (the "policy evaluation system 400"), according to an illustrative embodiment of the invention. The policy evaluation system 400 includes a memory 402, a processor 404, an input device 406 and an output 408, co-located on a single computing device.

Preferably, the memory 402 includes the industry-wide SCAL frequency and severity distributions, as well the non-SCAL frequency and severity distributions (collectively, the "industry-wide data 410"). Alternatively, the memory 402 includes instructions 412 (the "industry-wide distribution instructions 412"), which if executed on the processor 404, results in the policy evaluation system 400 retrieving data required for calculating such distributions. The execution of the industry-wide distribution instructions 412 also results in the processor 404 carrying out the calculation of such distributions (i.e., referring back to FIG. 1, steps 102, 106, 110, and 112) from the retrieved data.

The memory 402 also includes premium evaluation instructions 414 for evaluating a proposed insurance policy. If executed on the processor 404, the premium calculation instructions 414 preferably cause the premium evaluation system 400 to obtain the identification of a company and requested insurance policy parameters from a user. Preferably, the premium evaluation instructions 414 further cause the premium evaluation system 400 to retrieve company-specific data 416, either from the memory 402 or from an external data source 418, for the company identified by the user. Alternatively, the premium evaluation instructions 414 cause the premium evaluation system 400 to request the input of the company-specific data 416 from the user. Based on the company-specific data 416 and the industry wide data 410, the premium evaluation method 414 determines a benchmark premium for the company. If the user does not enter a market premium as a policy parameter, the premium evaluation instructions 414 preferably cause the premium evaluation system 400 to output a suggested premium determined according to the premium determination method 100, described above. If the user provides a market premium as an input parameter, the premium evaluation instructions 414 further causes the premium evaluation system to generate a policy evaluation chart, such as policy evaluation chart 300, indicating an evaluation of the requested policy according to the policy request evaluation method 200.

The instructions 412 and 414 preferably take the form of a computer software application (either in source code or object code). For example, the instructions may be encoded in a spreadsheet program such as EXCEL™, sold by Microsoft Corporation of Redmond, Wash. Alternatively, the instructions may be combined into a standalone software application programmed in the C, C++, JAVA™, VISUAL BASIC™ or other high level programming language.

The processor 404 can be a general or special purpose processor, programmable ROM device, application specific processor, a digital signal processor, or a combination thereof. The input device 406 accepts input from a user to be used in evaluating proposed requested policies and for calculating suggested premiums. For example, the input device may include a keyboard, mouse, trackball, touch screen, microphone, or any other form of input device known to those skilled in the art for accepting data into a computing device. The output device 408 can be a display screen, a speaker, or any other device known by those skilled in the art for presenting information to a computer user. In an additional implementation, the premium evaluation system 400 may also include a printer as an output device 408 for printing out suggested premiums and policy request evaluations.

Figure 5:
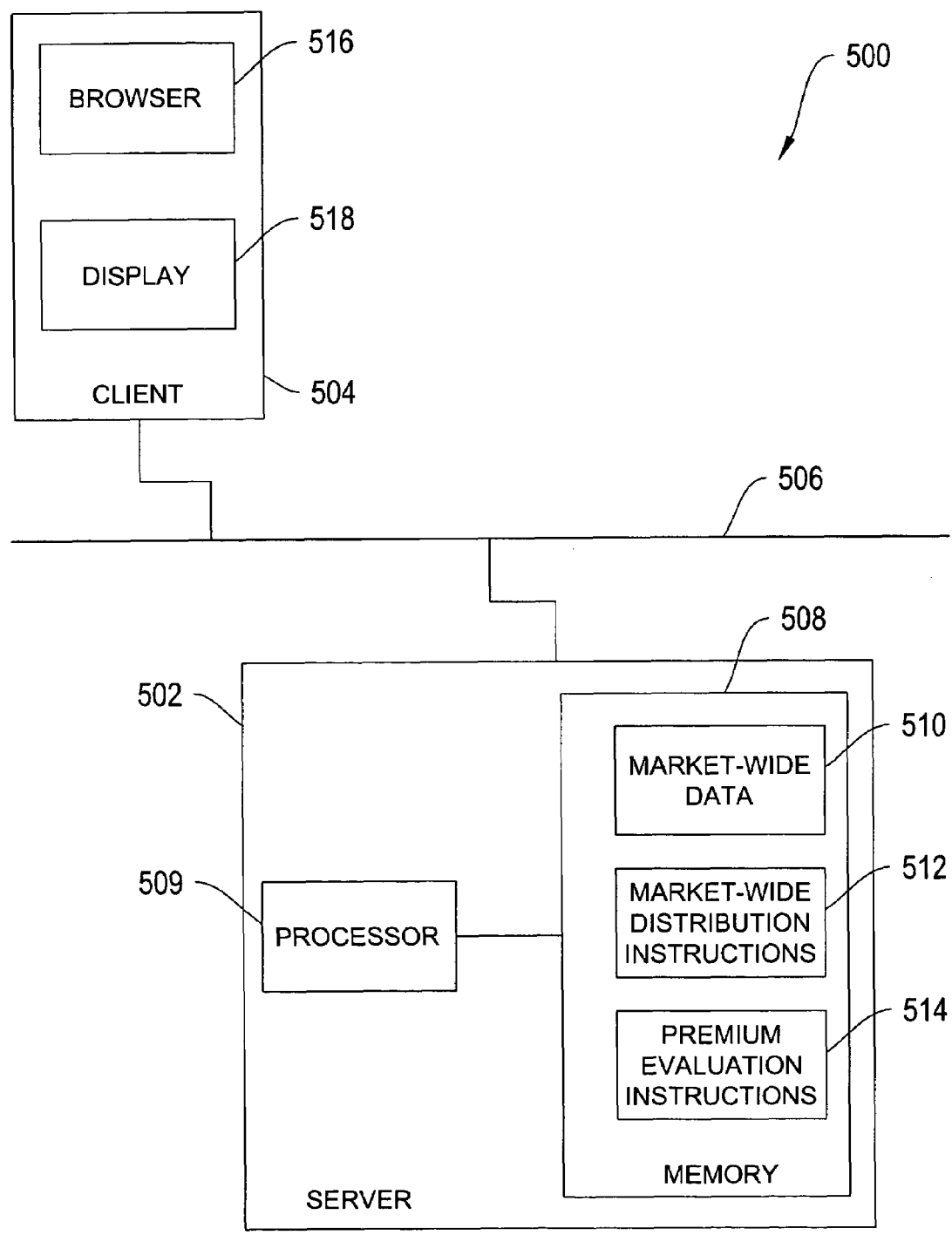
FIG. 5 is a block diagram of a client-server implementation of a premium evaluation system, according to an illustrative embodiment of the invention.

FIG. 5 is a block diagram of a client-server implementation of a premium evaluation system 500 (the "client-server system 500"), according to an illustrative embodiment of the invention. The client-server system 500 can be accessed by a potential customer conducting research on insurance policies. The client server system 500 may also be used by a remotely located insurance agent, underwriter or broker. The client-server system 500 includes at least one server 502 and one or more client computing devices, such as client computing device 504. The server 502 and the client computing device 504 communicate via a network 506, such as a local area or wide area network. In one particular example, the server 502 and the client computing device communicate over the Internet using HTTP or a similar protocol. Such communications may be secured, for example, using a secure socket layer protocol or other encryption scheme known in the art.

The server 502 includes a server memory 508 and a server processor 509. The server memory 508 preferably stores industry-wide SCAL frequency and severity distributions as well the non-SCAL frequency and severity distributions (collectively, the "industry-wide data 510"). Alternatively, the server memory 508 includes instructions 512 (the "industry-wide distribution instructions 512"), which if executed on the server processor 509, results in the server 502 retrieving data required for calculating such distributions. The execution of the industry-wide distribution instructions 510 also results in the server processor 509 carrying out the calculation of such distributions from the retrieved data.

The server memory 508 also preferably stores premium evaluation instructions 512, similar to the premium evaluation instructions 414. The premium evaluation instructions 512, however, are adapted for the client-server implementation. For example, in response to being executed on the server processor 509, the premium evaluation instructions 514 cause the server processor 509 to send input requests to the client computing device 504, and to send the results of any evaluation back to the client computing device 504 for output to the user of the client computing device 504.

The client computing device 504 can be a desktop computer, a laptop, a handheld computer, or other computing device having sufficient computing and user interface components to interact with the server 502. The client computing device 504 includes the capability to access the services provided by the server 502, preferably by employing a browser application 516, such as Internet Explorer™, provided by Microsoft Corporation of Redmond, Wash. A client computing device 504 user utilizes the browser application 516 to log into a web site provided by the insurer, hosted, for example, on the server 502. Alternatively the client computing device 504 accesses the server 502 using a dedicated application designed for accessing and interacting with the server 502. The client computing device 504 also includes a display 518 for displaying the input requests from the server 502 and the results of evaluation carried out on the server 502. Preferably, the display 518 includes a monitor, a LCD display, a projector, or a printer.

Figure 6:
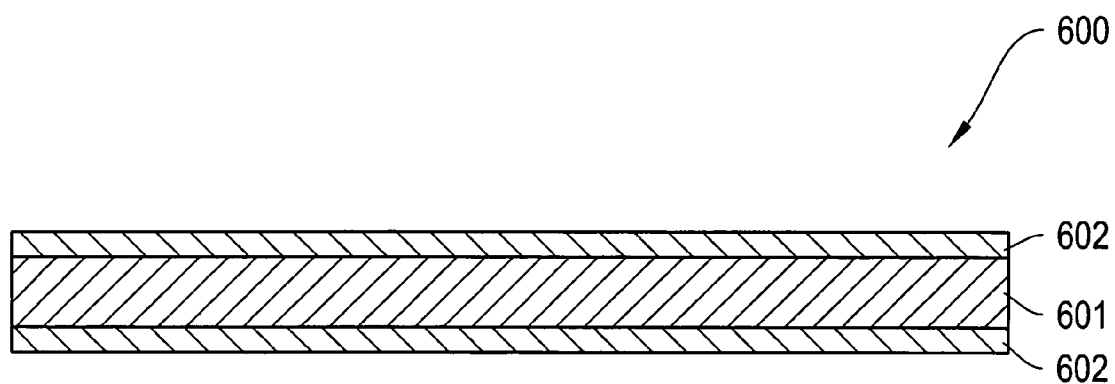
FIG. 6 is a cross-sectional view of a magnetic data storage medium encoded with a set of machine-executable instructions for performing the methods of FIGS. 1 and 2, according to an illustrative embodiment of the invention.

FIG. 6 shows a cross section of a magnetic data storage medium 600 which can be encoded with a machine-executable program, such as the premium evaluation instructions 414 and 512 and the industry-wide distribution instructions 412 of FIGS. 4 and 5, for carrying out the methods of FIGS. 1 and 2. The medium 600 can be employed by premium evaluation systems, such as the standalone premium evaluation system 400 and the client-server system 500. Medium 600 can be a conventional floppy diskette or hard disk, having a suitable substrate 601, which may be conventional, and a suitable coating 602, which may be conventional, on one or both sides, containing magnetic domains (not visible) whose polarity or orientation can be altered magnetically. Medium 600 may also have an opening (not shown) for receiving the spindle of a disk drive or other data storage device.

The magnetic domains of coating 602 of medium 600 are polarized or oriented so as to encode, in a manner which may be conventional, a machine-executable program such as that described above in connection with FIGS. 1-5, for execution by a system such as systems 400 or 500 of FIGS. 4 and 5.

Figure 7:
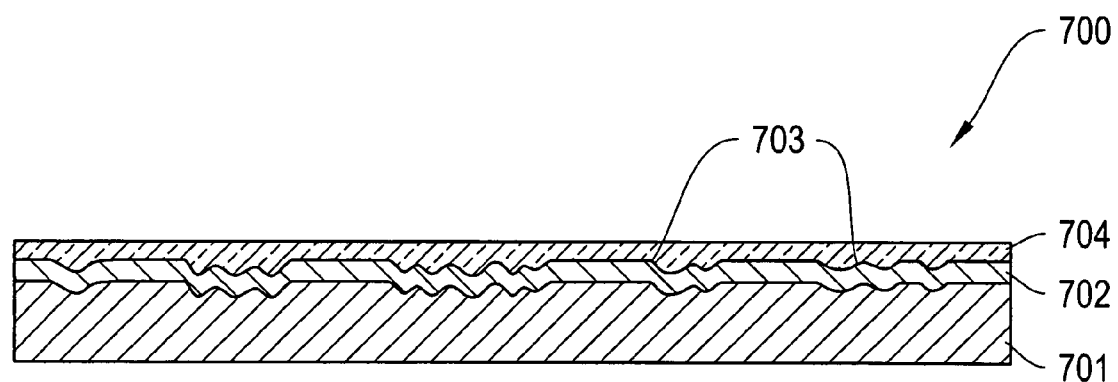
FIG. 7 is a cross-sectional view of an optically readable data storage medium encoded with a set of machine-executable instructions for performing the methods of FIGS. 1 and 2, according to an illustrative embodiment of the invention.

FIG. 7 shows a cross section of an optically-readable data storage medium 700 which also can be encoded with such a machine-executable program such as the premium evaluation instructions 414 and 512 and the industry-wide distribution instructions 412 of FIGS. 4 and 5, for carrying out the methods of FIGS. 1 and 2. The medium 700 can be employed by premium evaluation systems, such as the standalone premium evaluation system 400 and the client-server system 500. Medium 700 can be a conventional compact disk read only memory (CD-ROM) or digital video disk read only memory (DVD-ROM) or a rewriteable medium such as a CD-R, CD-RW, DVD-R, DVD-RW or DVD-RAM or a magneto-optical disk which is optically readable and magneto-optically rewriteable. Medium 700 preferably has a suitable substrate 701, which may be conventional, and a suitable coating 702, which may be conventional, usually on one or both sides of substrate 701.

In the case of a CD-based or DVD-based medium, as is well known, coating 702 is reflective and is impressed with a plurality of pits to encode the machine-executable program. The arrangement of pits is read by reflecting laser light from one or more lasers off the surface of coating 720. A protective coating 704 which preferably is substantially transparent, is provided on top of coating 702.

In the case of magneto-optical disk, as is well known, coating 702 has no pits 703, but has a plurality of magnetic domains whose polarity or orientation can be changed magnetically when heated above a certain temperature, as by a laser (not shown). The orientation of the domains can be read by measuring the polarization of laser light reflected from coating 702. The arrangement of the domains encodes the program as described above.

The invention may be embodied in other specific forms without departing from the spirit or essential characteristics thereof. In particular, the various statistical measures and parameters included throughout the application were derived from particular data sets. The use of other data sets may yield different statistical measures and parameters without falling outside the scope the invention. The forgoing embodiments are therefore to be considered in all respects illustrative, rather than limiting of the invention.

What is claimed is:

1. A method of determining a premium for an insurance policy covering a company, comprising:
    calculating a class action lawsuit frequency distribution for the company;
    calculating a class action lawsuit severity distribution for the company;
    calculating a non-class action lawsuit loss distribution based on at least one of a history of non-class action lawsuit losses of the company, a history of non-class action lawsuit losses of a plurality of companies in a common industry sector as the company, a history of non-class action lawsuit losses of a plurality of companies having market capitalizations similar to that of the company, and a market-wide history of non-class action lawsuit losses;
selecting a desired return on the insurance policy;
calculating a risk load for the company based on the selected return;
calculating a benchmark premium for the company based on the calculated distributions and the risk load;
inputting a requested market premium for the insurance policy;
comparing the requested premium for the insurance policy with the calculated benchmark premium to determine the desirability of the insurance policy;
determining the insurance premium for the company responsive to said benchmark premium and the requested market premium; and
outputting the insurance premium to an output device.

2. The method of claim 1, wherein the class action lawsuit distribution includes a securities class action lawsuit frequency distribution.

3. The method of claim 1, comprising calculating at least one of a market-wide class action lawsuit frequency distribution and a market-wide class action lawsuit severity distribution.

4. The method of claim 1, wherein the calculating of the insurance premium is based at least in part on a layer of insurance the insurance policy covers.

5. The method of claim 1, wherein the calculating of the risk load is based at least in part on a layer of insurance the insurance policy covers.

6. The method of claim 2, wherein the securities class action lawsuit frequency distribution is calculated based at least in part on stock price variabilities, accounting and governance risk measures, and market capitalizations of the respective companies of the plurality of companies.

7. The method of claim 2, wherein the securities class action lawsuit severity distribution is based at least in part on a market capitalization regression coefficient.

8. The method of claim 1, wherein the insurance policy provides coverage for directors and officers liability.

9. The method of claim 1, wherein the class action lawsuit frequency distribution includes an ERISA class action lawsuit frequency distribution, and wherein the insurance policy provides coverage for fiduciary liability.

10. The method of claim 1, wherein the class action lawsuit frequency distribution includes an employment related class action lawsuit frequency distribution, and wherein the insurance policy provides coverage for employment practices liability.

11. The method of claim 1, wherein the class action lawsuit frequency distribution includes a products liability class action lawsuit frequency distribution, and wherein the insurance policy provides coverage for products liability.

12. The method of claim 1, wherein the insurance policy provides coverage for general liability.

13. The method of claim 1, wherein calculating the insurance premium is further based on an estimated expense load corresponding to the cost of writing the insurance policy.

14. A method of evaluating an insurance policy comprising:
calculating a benchmark premium by
calculating a class action lawsuit frequency distribution for a company;
calculating a class action lawsuit severity distribution for the company;
calculating a non-class action lawsuit loss distribution based on at least one of a history of non-class action lawsuit losses of the company, a history of non-class action lawsuit losses of a plurality of companies in a common industry sector as the company, a history of non-class action lawsuit losses of a plurality of companies having market capitalizations similar to that of the company, and a market-wide history of non-class action lawsuit losses;
selecting a desired return on the insurance policy;
calculating a risk load for the company based on the selected return on the insurance policy; and
calculating the benchmark premium for the selected company based on the calculated distributions and the calculated risk load;
inputting a requested market premium for the insurance policy;
comparing the requested market premium for the insurance policy with the calculated benchmark premium to determine the desirability of the insurance policy;
determining the insurance premium for the company responsive to said benchmark premium and the requested market premium; and
outputting the results of the comparison to an output device.

15. The method of claim 14, comprising calculating at least one of a market-wide class action lawsuit frequency distribution and a market-wide class action lawsuit severity distribution.

16. The method of claim 14, wherein the calculating of the insurance premium is based at least in part on a layer of insurance the insurance policy covers.

17. The method of claim 14, wherein the calculating of the risk load is based at least in part on a layer of insurance the insurance policy covers.

18. The method of claim 14, wherein the class action lawsuit frequency distribution includes a securities class action lawsuit frequency distribution.

19. The method of claim 18, wherein the securities class action lawsuit frequency distribution is calculated based at least in part on a stock price variability of the company, an accounting and governance risk measure, and market capitalization of the company.

20. The method of claim 14, wherein the class action lawsuit severity distribution is based at least in part on a market capitalization regression coefficient.

21. The method of claim 14, comprising calculating a risk score for the company based on at least one of the market capitalization, stock price variability, and accounting and governance risk measures of the company.

22. The method of claim 14, comprising evaluating the desirability of the insurance policy based at least in part on the calculated risk score.

23. The method of claim 14, wherein the risk load is based at least in part on a class action lawsuit frequency distribution.

24. The method of claim 14, wherein the insurance policy provides coverage for directors and officers liability.

25. The method of claim 14, wherein the class action lawsuit frequency distribution includes an ERISA class action lawsuit frequency distribution, and wherein the insurance policy provides coverage for fiduciary liability.

26. The method of claim 14, wherein the class action lawsuit frequency distribution includes an employment related class action lawsuit frequency distribution, and wherein the insurance policy provides coverage for employment practices liability.

27. The method of claim 14, wherein the class action lawsuit frequency distribution includes a products liability class action lawsuit frequency distribution, and wherein the insurance policy provides coverage for products liability.

28. The method of claim 14, wherein the insurance policy provides coverage for general liability.

29. The method of claim 14, wherein calculating the insurance premium is further based on an estimated expense load corresponding to the insurance policy.

30. A method of determining an insurance premium for an insurance policy covering a company comprising:
    calculating a securities class action lawsuit frequency distribution for the company based at least in part on a stock price variability of the company, an accounting and governance risk measure, and a market capitalization of the company;
    calculating a securities class action lawsuit severity distribution for the company based at least in part on the market capitalization of the company;
    calculating a non-class action lawsuit loss distribution based on historical data for a plurality of companies which is substantially unrelated to securities class action lawsuits;
    selecting a desired return on the insurance policy;
    calculating a risk load for the company based on the selected return and on a layer of insurance coverage provided;
    calculating a benchmark premium for the company for a particular insurance layer based on the calculated distributions and risk load
    inputting a market premium for the insurance policy;
    comparing the market premium for the insurance policy with the calculated benchmark premium to determine the desirability of the insurance policy;
    determining the insurance premium for the company responsive to said benchmark premium and the market premium.

31. A method of evaluating an insurance policy for a company comprising:
    calculating a benchmark premium by
        calculating a securities class action lawsuit frequency distribution for the company based at least in part on a stock price variability, an accounting and governance risk measure, and a market capitalization of the company;
        calculating a securities class action lawsuit severity distribution for the company based at least in part on the market capitalization of the company;
        calculating a non-class action lawsuit loss distribution based on historical data for a plurality of companies which is substantially unrelated to securities class action lawsuits;
        selecting a desired return on the insurance policy;
        calculating a risk load for the company based on the selected return and on a layer of insurance coverage provided; and
        calculating the benchmark premium for the company for a particular insurance layer based on the calculated distributions and risk load;
    calculating a benchmark premium for the company for a particular insurance layer based on the calculated distributions and risk load
    inputting a requested market premium for the insurance policy;
    comparing a requested market premium for the insurance policy with the calculated benchmark premium to determine the desirability of the insurance policy; and
    determining the insurance premium for the company responsive to said benchmark premium and the market premium.

32. A computer readable medium encoding instructions for causing a computing device to carry out a method of determining a premium for an insurance policy covering a company, the method comprising:
    calculating a class action lawsuit frequency distribution for the company;
    calculating a class action lawsuit severity distribution for the company;
    calculating a non-class action lawsuit loss distribution;
    selecting a desired return on the insurance policy;
    calculating a risk load for the company based on the selected return; and
    calculating a benchmark premium for the company based on the calculated distributions and the risk load;
    inputting a market premium for the insurance policy;
    comparing the market premium for the insurance policy with the calculated benchmark premium to determine the desirability of the insurance policy;
    determining the insurance premium for the company responsive to said benchmark premium and the market premium.

33. A computer readable medium encoding instructions for causing a computing device to carry out a method of evaluating an insurance policy, the method comprising:
    calculating a benchmark premium by
        calculating a class action lawsuit frequency distribution for a company;
        calculating a class action lawsuit severity distribution for the company;
        calculating a non-class action lawsuit loss distribution;
        selecting a desired return on the insurance policy;
        calculating a risk load for the company based on the selected return; and
        calculating the benchmark premium for the selected company based on the calculated distributions and the calculated risk load;
    inputting a requested market premium for the insurance policy;
    comparing a requested market premium for the insurance policy with the calculated benchmark premium to determine the desirability of the insurance policy; and
    determining the insurance premium for the company responsive to said benchmark premium and the requested market premium.

34. The method of claim 3, wherein the market-wide securities class action lawsuit frequency distribution is a negative binomial distribution.

35. The method of claim 34, wherein the negative binomial distribution is defined by the equation:

$$P(z)=[1-\beta(z-1)]^r$$

where $P(z)$ is the probability that an rth occurrence of an event will occur after z years, and $\beta$ corresponds to the probability that a company will face a class action lawsuit in a given year divided by the complement of the probability.

36. The method of claim 1, wherein the class action lawsuit frequency distribution further comprises
    calculating a market-wide securities class action lawsuit frequency distribution; and
    calculating a likelihood value L, wherein the likelihood value indicates the likelihood of a securities class action lawsuit, wherein L being determined by the equation:

$$L(X; B) = \frac{1}{1 + e^{-\alpha - \sum x_i \beta_i}} \in [0, 1]$$

wherein X corresponds to the set of variables identified in the regression analysis as being related to securities class action lawsuit frequency, and B includes a corresponding set of coefficient for the variables listed.

37. The method of claim 3, wherein calculating the market-wide securities class action lawsuit severity distribution is a lognormal probability distribution.

38. The method of claim 1, further comprising calculating the non-class action lawsuit loss severity distribution, wherein said non-class action lawsuit loss severity distribution is a lognormal probability distribution.

39. The method of claim 38, wherein the lognormal probability distribution is defined by the equation:

$$f(x) = \frac{e^{-\ln(x-\mu)^2/2\sigma^2}}{x\sigma\sqrt{2\pi}}, x \geq 0, \sigma > 0$$

where $\sigma$ corresponds to a shape parameter, and $\mu$ corresponds to the relative position of the distribution along the x-axis.

40. The method of claim 1, wherein calculating the insurance premium for the company based on the calculated distributions further comprises simulating a large number of years using the calculated class action lawsuit frequency distributions, non-class action lawsuit frequency distributions, class action lawsuit loss severity distributions, and non-class action lawsuit loss severity distributions.

41. The method of claim 40, wherein the simulating a large number of years utilizes a Monte Carlo simulation to determine whether each loss, if any, is a securities class action lawsuit loss or a non-class action lawsuit loss, according to the calculated class action lawsuit frequency distribution and the calculated non-class action lawsuit frequency distribution.

42. The method of claim 40, wherein the simulating a large number of years utilizes a Latin Hypercube to assign a severity to each loss, if any, according to the calculated class action lawsuit loss severity distribution and the calculated non-class action lawsuit loss severity distribution.

43. The method of claim 21, wherein the step of calculating a risk score further comprises:
   totaling the scores assigned to a loss severity level and a loss frequency level,
   dividing the total by the highest possible risk score, and scaling the result by a constant.

44. A method of determining a premium for an insurance policy covering a company, comprising:
   calculating a securities class action lawsuit frequency distribution for the company based on stock price variabilities, accounting and governance risk measures, and market capitalization;
   calculating a securities class action lawsuit severity distribution for the company selecting a desired return on the insurance policy;
   calculating a risk load for the company based on the selected return;
   calculating a benchmark premium for the company based on the calculated distributions and the risk load; and
   inputting a market premium for the insurance policy;
   comparing the market premium for the insurance policy with the calculated benchmark premium to determine the desirability of the insurance policy;
   determining the insurance premium for the company responsive to said benchmark premium and the market premium.

* * * * *